US006266741B1

(12) United States Patent
Hui et al.

(10) Patent No.: US 6,266,741 B1
(45) Date of Patent: Jul. 24, 2001

(54) METHOD AND APPARATUS TO REDUCE SYSTEM BUS LATENCY ON A CACHE MISS WITH ADDRESS ACKNOWLEDGMENTS

(75) Inventors: Chau-Shing Hui; Krishnamurthy Venkatramani; Barry Joe Wolford, all of Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/094,905

(22) Filed: Jun. 15, 1998

(51) Int. Cl.[7] .................................................. G06F 12/00
(52) U.S. Cl. ........................................ 711/122; 711/169
(58) Field of Search ............................ 711/3, 118, 119, 711/122, 140, 167, 169

(56) References Cited

U.S. PATENT DOCUMENTS

| | | | |
|---|---|---|---|
| 5,195,089 | 3/1993 | Sindhu et al. | 370/85.1 |
| 5,404,464 | 4/1995 | Bennett | 395/325 |
| 5,465,333 | 11/1995 | Olnowich | 395/281 |
| 5,481,681 | 1/1996 | Gallo et al. | 395/325 |
| 5,517,624 | 5/1996 | Landry et al. | 395/287 |
| 5,555,383 | 9/1996 | Elazar et al. | 395/306 |
| 5,608,878 | 3/1997 | Arimilli et al. | 395/287 |
| 5,623,694 | 4/1997 | Arimilli et al. | 395/825 |
| 5,640,518 | 6/1997 | Muhich et al. | 395/290 |

OTHER PUBLICATIONS

IBM Technical Disclosure Bulletin, vol. 37, No. 05, May. 1994, Separating the Interaction of Address and Data State during Bus Data Transfers.

IBM Technical Disclosure Bulletin, vol. 37, No. 06A, Jun. 1994, Address Pipelining with a Flexible Control Mechanism for Shared Bus Protocols.

IBM Technical Disclosure Bulletin, vol. 39, No. 11, Nov. 1996, Improving L1/L2 Cast–Out Performance in an Inclusive Serial Cache.

*Primary Examiner*—Kevin Verbrugge
(74) *Attorney, Agent, or Firm*—Casimer K. Salys; Felsman, Bradley, Vaden, Gunter & Dillon, LLP

(57) ABSTRACT

A method of providing a value to a cache used in a computer system, by transmitting the value from a system memory device to a lower level (e.g., L2) of the cache using a system bus, acknowledging the forwarding of the address from the lower level of the cache after said transmitting of the value, and acknowledging the forwarding of the address from a higher level (e.g., on-board) of the cache, in response to said transmitting step. The acknowledging of the forwarding of the address from the higher level of the cache, can occur prior to the acknowledgment of the forwarding of the address from the lower level of the cache. The value is transmitted from the lower level of the cache to the higher level of the cache using the higher level bus, in response to said acknowledgement of the forwarding of the address from the higher level of the cache, and this latter transmission can also occur prior to said acknowledgment of the forwarding of the address from the lower level of the cache. This approach results in reduced memory access latency with L2 cache misses, and improves address bus utilization on the higher level bus.

16 Claims, 4 Drawing Sheets

CPU_TS_
CPU_AACK_
CPU_ARTRY_
CPU_TA_
SYS_TS_
SYS_AACK_
SYS_ARTRY_
SYS_TA_
CLOCK

METHOD AND APPARATUS TO REDUCE SYSTEM BUS LATENCY ON A CACHE MISS WITH ADDRESS ACKNOWLEDGMENTS

BACKGROUND OF THE INVENTION

1. Field of the Invention

The present invention generally relates to computer systems, and more specifically to a method of reducing memory access latency when a processor of a computer system requests a value which is not currently located in the processor's cache memory, and particularly to such a method adapted for use with a computing system wherein a higher level bus (such as a processor bus) operates at a different frequency from that of a lower level bus (such as the system bus).

2. Description of Related Art

A typical structure for a conventional computer system includes one or more processing units connected to a system memory device (random access memory or RAM) and to various peripheral, or input/output (I/O), devices such as a display monitor, a keyboard, a graphical pointer (mouse), and a permanent storage device (hard disk). The system memory device is used by a processing unit in carrying out program instructions, and stores those instructions as well as data values that are fed to or generated by the programs. A processing unit communicates with the peripheral devices by various means, including a generalized interconnect or bus, or direct memory-access channels. A computer system may have many additional components, such as serial and parallel ports for connection to, e.g., modems, printers, and network adapters. Other components might further be used in conjunction with the foregoing; for example, a display adapter might be used to control a video display monitor, a memory controller can be used to access the system memory, etc.

A conventional processing unit includes a processor core having various execution units and registers, as well as branch and dispatch units which forward instructions to the appropriate execution units. Caches are commonly provided for both instructions and data, to temporarily store values that might be repeatedly accessed by a processor, in order to speed up processing by avoiding the longer step of loading the values from system memory (RAM). These caches are referred to as "on-board" when they are integrally packaged with the processor core on a single integrated chip. Each cache is associated with a cache controller or bus interface unit that manages the transfer of values between the processor core and the cache memory.

A processing unit can include additional caches, such as a level 2 (L2) cache which supports the on-board (level 1) caches. In other words, the L2 cache acts as an intermediary between system memory and the on-board caches, and can store a much larger amount of information (both instructions and data) than the on-board caches can, but at a longer access penalty. Multi-level cache hierarchies can be provided where there are many levels of interconnected caches.

A typical system architecture is shown in FIG. 1, and is exemplary of the PowerPC™ processors marketed by International Business Machines Corporation (IBM—assignee of the present invention). Computer system 10 includes a processing unit 12*a*, various I/O devices 14, RAM 16, and firmware 18 whose primary purpose is to seek out and load an operating system from one of the peripherals whenever the computer is first turned on. Processing unit 12*a* communicates with the peripheral devices using a bus 20. Processing unit 12*a* includes a processor core 22, and an instruction cache 24 and a data cache 26, which are implemented using high speed memory devices, and are integrally packaged with the processor core on a single integrated chip 28. Cache 30 (L2) supports caches 24 and 26. For example, cache 30 may be a chip having a storage capacity of 256 or 512 kilobytes, while the processor may be an IBM PowerPC™ 604-series processor having on-board caches with 64 kilobytes of total storage. Cache 30 is connected to system bus 20 and a cache or processor bus 32, and all loading of information from memory 16 into processor core 22 must come through cache 30. More than one processor may be provided, as indicated by processing unit 12*b*.

An exemplary cache line (block) includes an address tag field, a state bit field, an inclusivity bit field, and a value field for storing the actual instruction or data. The state bit field and inclusivity bit fields are used to maintain cache coherency in a multi-processor computer system (indicating the validity of the value stored in the cache). The address tag is a subset of the full address of the corresponding memory block. A compare match of an incoming address with one of the tags within the address tag field indicates a cache "hit." The collection of all of the address tags in a cache is referred to as a directory (and sometimes includes the state bit and inclusivity bit fields), and the collection of all of the value fields is the cache entry array.

When a cache receives a request from a processor core, whether a read or write operation, to access a memory location, and the cache does not have a current valid copy of the value (data or instruction) corresponding to that memory location (a cache "miss"), the cache must wait to fulfill the request until the value can be retrieved from a location lower in the memory hierarchy. Cache misses thus introduce a memory access latency penalty, and can occur at every level of the cache architecture. When a cache miss occurs at the lowest level (e.g., the L2 cache in FIG. 1), the system bus latency can seriously degrade performance.

One technique for reducing bus latency involves "pipelining." An address of a memory block is passed using an address bus which is separate from the data bus used to transmit the actual value associated with the memory block. In a cache that allows pipelining, the address tenure of a subsequent (second) bus operation can overlap with the data tenure of a current (first) operation. This feature can improve bus throughput because most of the bus traffic involves burst transfers in which a lot of data is transferred with one address; for example, a microprocessor might transfer eight 32-bit words for each 32-bit address in a burst transfer. Overlapping of subsequent address phases with the lengthy data phase achieves a pipeline effect which can reduce the idle time on the data bus. With multi-processor systems in particular, there can be a large amount of inter-processor communications, many of which are address-only bus operations that do not require the data bus; by pipelining, these operations have a negligible impact on data bus bandwidth. In addition to allowing pipelining, a bus can also be "split," meaning that other bus activity, including activity from other processing units (masters), can start between the address and data tenures of a previous transaction.

In a system where the address and data buses are pipelined and split, additional design complexities are introduced in the bus interface logic. For example, in order to support a range of transaction types and maintain cache coherency states (which are used to ensure that only one processor has permission to write to a given memory location at any point in time and that all copies of the memory location are consistent), bus interface designs tend to couple the address bus operations with various aspects of the data bus operations. This coupling of the address bus and data bus operations, however, restricts expandability of the bus interface.

One method for decoupling the address and data buses is discussed in the article "Separating the Interaction of Address and Data State During Bus Data Transfers," IBM Technical Disclosure Bulletin, vol. 37, no. 5 (May 1994). According to that method, the address tenure begins with the TS_ signal (Transfer Start) asserted by the processor. A single signal AACK_ (Address ACKnowledge) is used to terminate the address tenure. No data bus signals can cause the address tenure to terminate. Two status lines are sampled during the cycle following address termination, including an address retry signal ARTRY_. The address tenure can be forced to re-execute via assertion of ARTRY_, by some other bus device which cannot immediately determine the appropriate response to the request (for example, if its snoop queue is already full). Data is generally not committed until the address tenure completes successfully and cannot be re-tried by other bus devices. In order to be able to commit data quickly, the specification constraints for this method require that any signaling of a retry must occur at the same time that the data is asserted. Retry cannot be signalled after this "retry window" even though the address tenure is still open.

The foregoing protocol for decoupling the address and data buses has the unfortunate effect of contributing to bus latency in a multi-level cache, that is, where two buses are connected together serially such that their address and data tenures are connected, and particularly when the clock frequencies of the two buses are different (e.g., a ratio such as 2:1 or 3:1). In this construction, a tenure (address or data) in the higher level bus (such as a CPU bus) is closed only after the same tenure is closed on the lower level bus (such as the system bus), as shown in FIG. 2.

In FIG. 2 (which assumes a 2:1 clock ratio), the address tenure on the processor bus begins with the assertion of the CPU_TS_ signal. When an L2 miss occurs, the request is asserted on the system bus using the SYS_TS_ signal. Sometime thereafter, the address tenure on the system bus is terminated by toggling SYS_AACK, and the signal SYS_ARTRY_ is checked. The next cycle, CPU_AACK is asserted to terminate the address tenure on the CPU bus. This constraint further prevents the L2 controller from returning data to the CPU bus until SYS_AACK_ is asserted. If, however, a retry was not actually issued, then the bridge waits unnecessarily until the assertion of SYS_AACK_ to close the CPU address tenure. It would, therefore, be desirable and advantageous to devise a bus interface for a bus bridge, such as an L2 controller, which reduced bus latency by returning data from the system bus to the CPU bus in a more efficient manner.

SUMMARY OF THE INVENTION

It is therefore one object of the present invention to provide an improved cache memory for a computer system.

It is another object of the present invention to provide such an improved cache memory which has at least two cache levels, and which reduces the latency in receiving data at a higher level bus (e.g., processor bus) from a lower level bus (e.g., system bus).

It is yet another object of the present invention to provide such an improved cache memory which improves address bus utilization on the higher level bus.

The foregoing objects are achieved in a method of providing a value to a cache used in a computer system, generally comprising the steps of loading the value into a memory array of the computer system, forwarding an address of the value from a higher level of the cache to a lower level of the cache using a higher level bus, determining that a cache miss of the value has occurred at the lower level of the cache, forwarding the address from the lower level of the cache to the memory array using a lower level bus, transmitting the value from the memory array to the lower level of the cache using the lower level bus, acknowledging the forwarding of the address from the lower level of the cache after said step of transmitting the value from the memory array, and acknowledging the forwarding of the address from the higher level of the cache, in response to said transmitting step. The acknowledging of the forwarding of the address from the higher level of the cache, can occur prior to said step of acknowledging the forwarding of the address from the lower level of the cache. The value is transmitted from the lower level of the cache to the higher level of the cache using the higher level bus, in response to said step of acknowledging the forwarding of the address from the higher level of the cache, and this transmission can also occur prior to said step of acknowledging the forwarding of the address from the lower level of the cache. This approach results in reduced memory access latency with L2 cache misses, and improves address bus utilization on the higher level bus.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DESCRIPTION OF AN ILLUSTRATIVE EMBODIMENT

Figure 1:
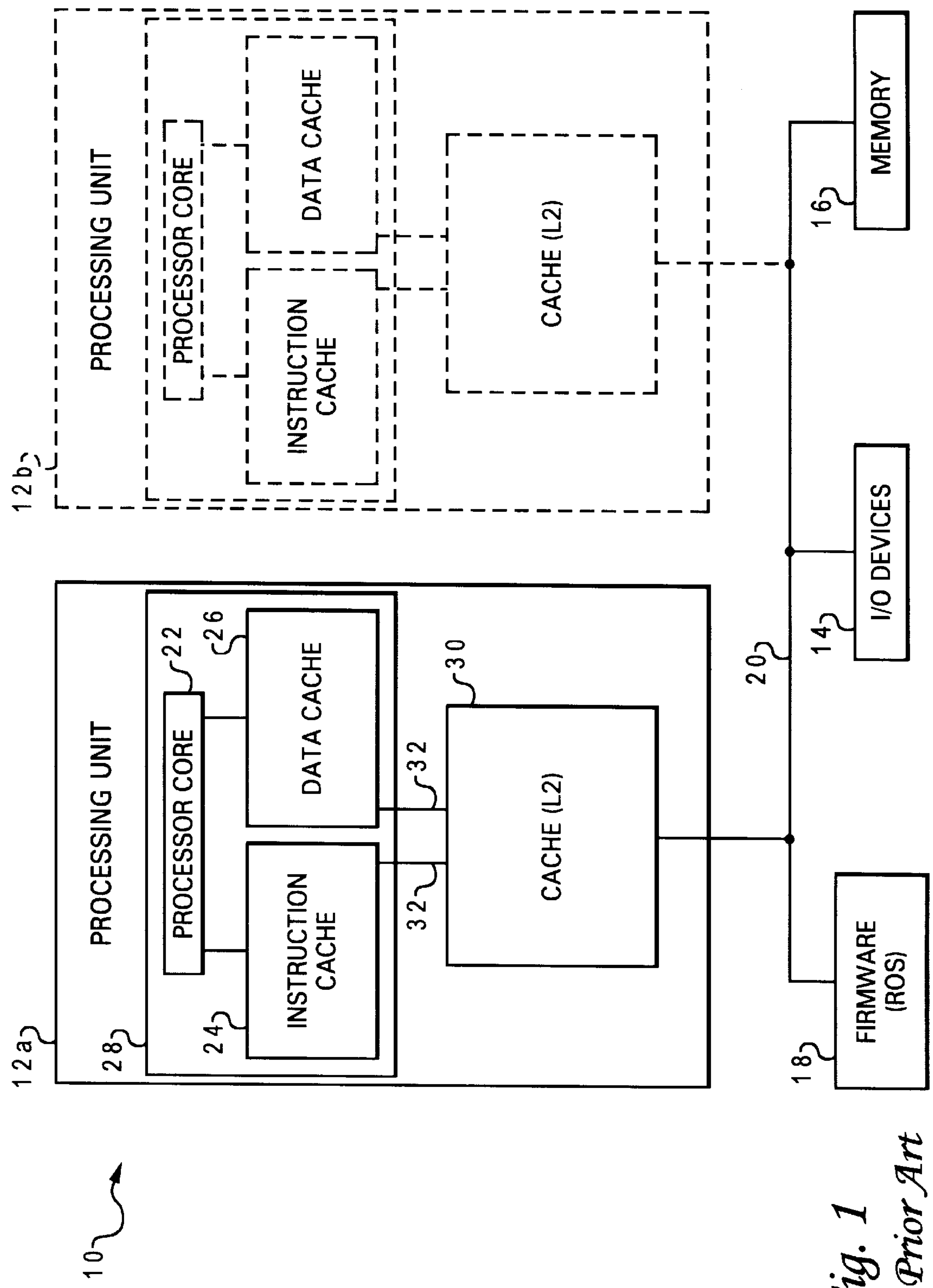
FIG. 1 is a block diagram of a prior-art multi-processor computer system.
Figure 2:
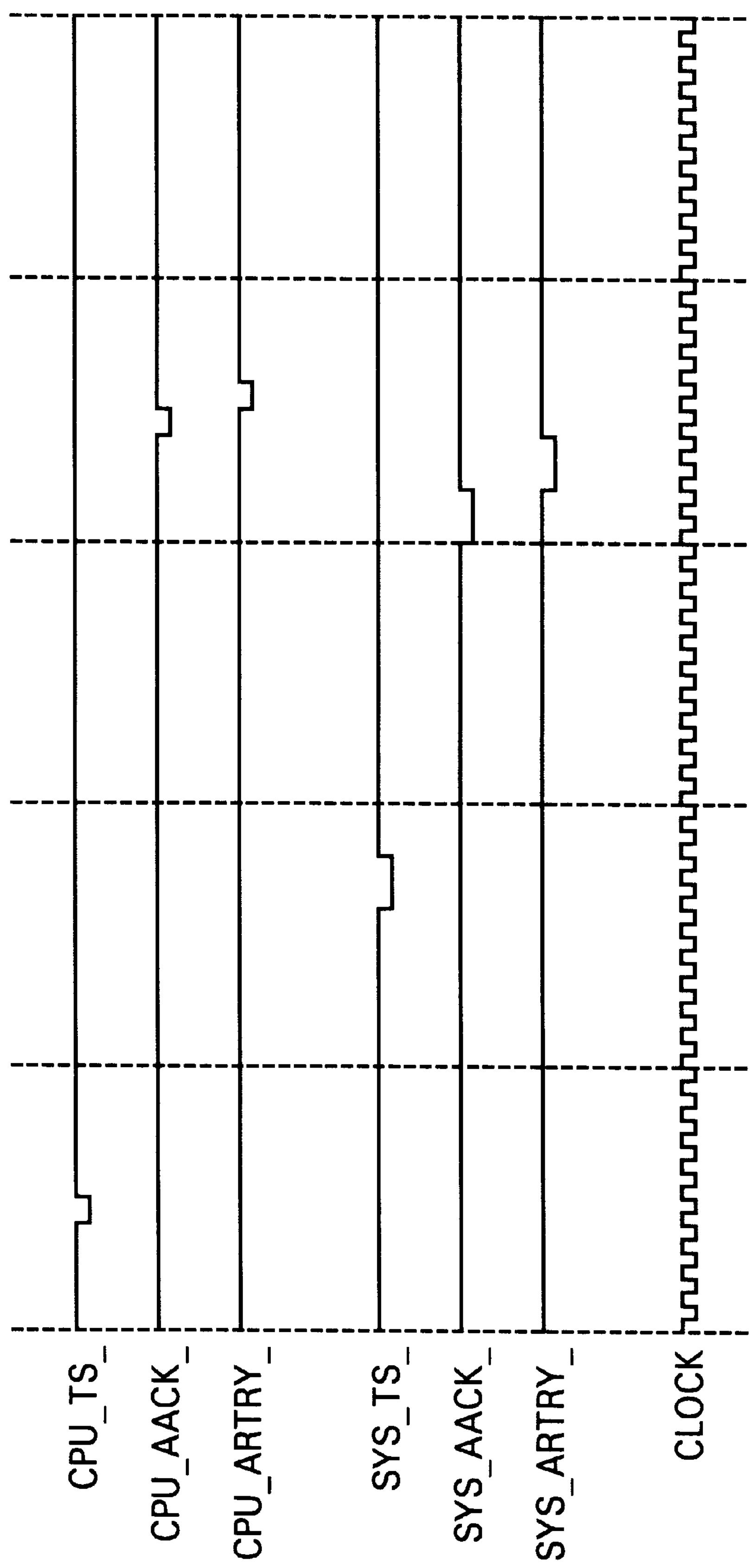
FIG. 2 is a timing diagram illustrating address tenure and completion on a CPU bus and a system bus, based on a prior art bus interface design for a cache memory.
Figure 3:
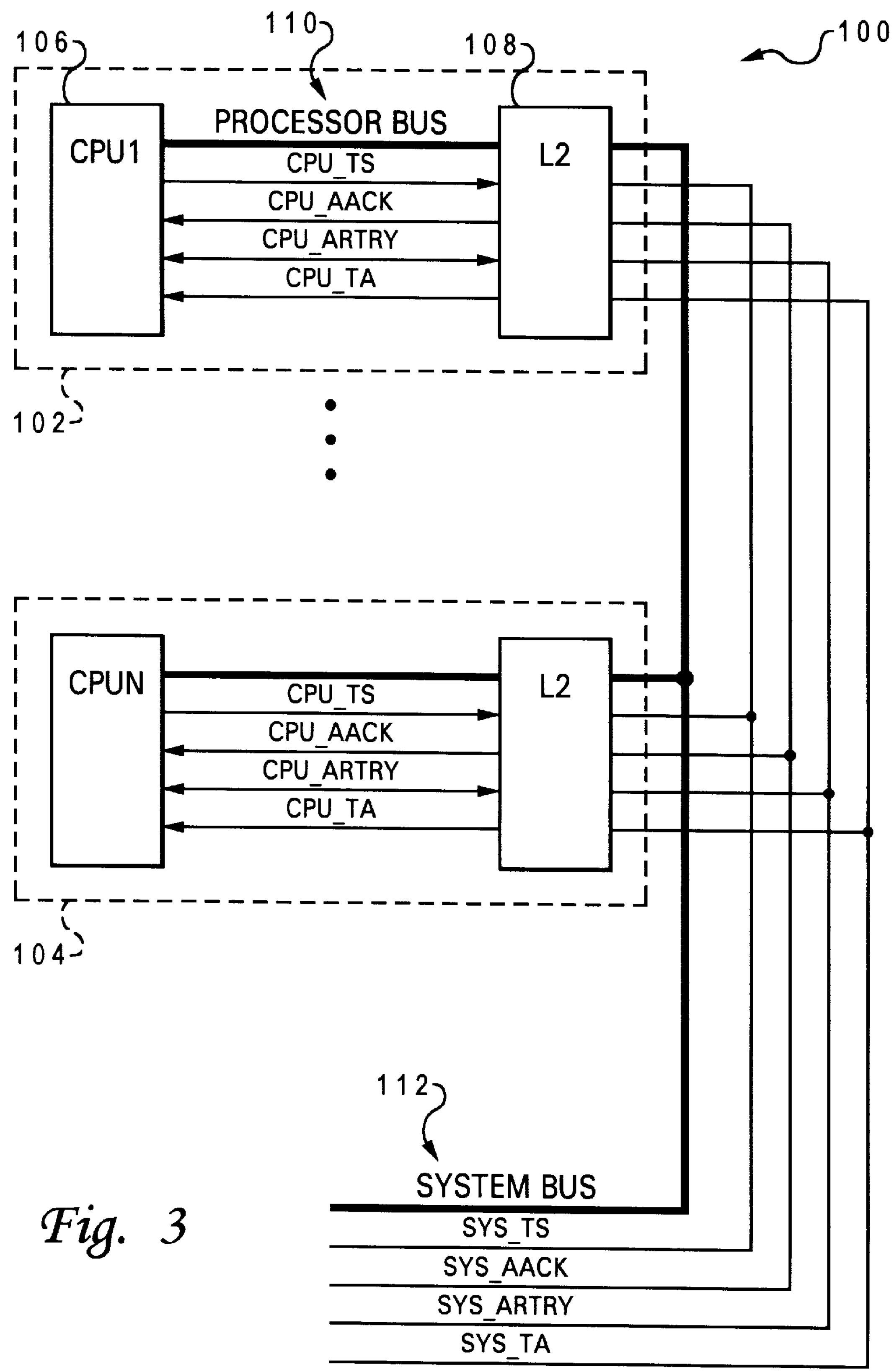
FIG. 3 is a block diagram of a data processing system having a cache memory according to one embodiment of the present invention.

With reference now to the figures, and in particular with reference to FIG. 3, there is illustrated a block diagram of one embodiment of a data processing system 100 having a cache memory constructed in accordance with the present invention. In FIG. 3, the data processing system includes at least two processors 102 and 104, but it is understood that the present invention also applies to a uniprocessor system, as well as to a multi-processor system having many more than just two processors. Furthermore, the present invention may be used in multi-processor computer systems other than symmetric multi-processor (SMP) systems which share a common system memory (RAM); for example, the invention could be applied to a non-uniform memory access (NUMA) system wherein the system memory is divided among two or more memory arrays (having separate memory controllers connected to the system bus), and allocated among the processing units.

The description below for processor 102 generally applies to processor 104 as well since, in the preferred embodiment, each of the processors are generally identical. Processor 102 has a CPU 106 which may be of a superscalar, reduced instruction set computing (RISC) type, and includes an on-chip instruction cache and data cache. A suitable processor is the IBM PowerPC™ processor. Both of the on-board caches are connected to the processor core of CPU 106 by separate paths within a local bus structure, having separate cache controllers for data and instructions.

A lower level, or secondary (L2) cache 108 is also connected to CPU 106 (that is, to the on-board caches of CPU 106) via a cache or processor bus 110. Secondary cache 108 is much larger than either of the on-board instruction and data caches, and access to secondary cache 108 is also somewhat slower than to either of the on-board caches. Secondary cache 108 includes a bus interface in which timing and control translations between processor bus 110 and a system bus 112 take place. A system memory device (RAM) is connected to system bus 110, and one or more peripheral devices may also be coupled to system bus 110, such as a permanent storage device (hard disk), possibly using one or more intervening buses, such as an I/O bus. In this embodiment, processor bus 110 operates at a clock speed which is roughly twice that of system bus 112.

The memory hierarchy is from the fastest to the slowest, from the smallest to the largest, and from the most expensive per bit to the least expensive per bit, in progression from the on-board caches, to secondary cache 108, to the main memory, and to the disk storage device. The main memory contains a subset of what is in the disk storage device (along with other data or instructions which have been generated by programs running in the processors, that have not been written to the disk storage device); secondary cache 108 contains a subset of what is in the main memory, and each of the on-board caches contain a subset of what is in secondary cache 108. CPU 106 can access the on-board caches within a processor cycle, while it may take several processor cycles to access secondary cache 108.

If a cache miss occurs in one of the on-board caches, and subsequently in secondary cache 108 (i.e., a second level cache miss), then the main memory is accessed to perform a cache linefill operation, replacing a cache line with an equivalent bit portion (value) from the main memory which contains the addressed data or instruction. This cache linefill operation must be performed in order to satisfy the attempted cache access for which a cache miss occurred. If the main memory does not contain the location for which the cache linefill operation is attempted, then a page containing this data is obtained from the disk storage device such that the cache linefill operation can be completed. The time for acquiring a page from the disk storage device and writing it to the main memory may require many thousands of processor cycles, during which CPU 106 may be switched to do another task, or stalled in order to wait for the value to satisfy the request.

The present invention reduces the time penalty for going to the next level in a cache memory hierarchy to satisfy a request that missed a higher cache level. As explained in the Background, when two buses are connected together serially (by an L2 cache) such that their address and data tenures are connected, a tenure in the higher level bus is closed only after the same tenure is closed on the lower level bus. The resulting memory latency is exacerbated if the frequencies of the buses are different. The present invention allows a tenure (e.g., an address tenure) on the higher level bus (such as processor bus 110) to close prior to the closing of the corresponding tenure on the lower level bus (such as system bus 112). The reduction in memory access latency is achieved by using a property of the PowerPC™ 60X bus, specifically, the timing relationship between the data tenure and the retry signal.

This invention takes advantage of the data tenure constraints on the retry window, by recognizing that the address tenure in the higher level bus can be closed not only by the closure of the address tenure on the lower level bus, but also by the starting of the data tenure on the lower level bus. Use of this second condition for closure (starting of the data tenure on the lower level bus) improves address bus utilization on the higher level bus. This effect is illustrated in FIG. 4.

Figure 4:
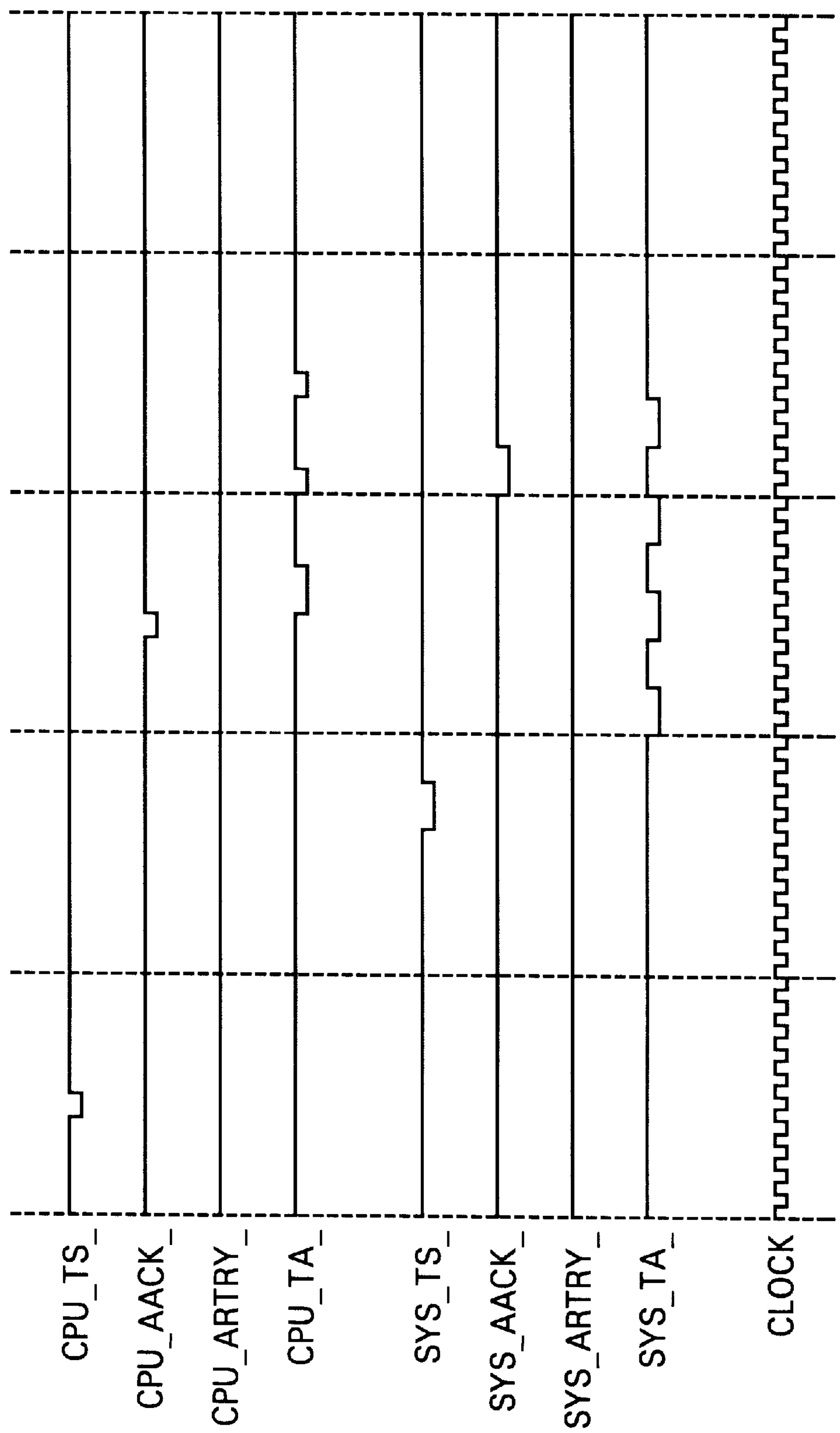
FIG. 4 is a timing diagram illustrating one example of address tenure and completion on a CPU bus and a system bus, according to an implementation of the present invention with the embodiment of FIG. 3.

FIG. 4 is a timing diagram which shows an example of address tenure and completion on processor bus 110 and system bus 112, according to the present invention. Processor bus 110 provides several control signals used by the cache controllers, including a first signal CPU_TS_ which is asserted by CPU 106 to start the address tenure, a second signal CPU_AACK_ which is asserted by secondary cache 108 to terminate the address tenure, a third signal CPU_ARTRY_ which is used to force re-execution of the request, and a fourth signal CPU_TA_ which is asserted by secondary cache 108 to start the data tenure. System bus 112 similarly provides several control signals, including a first signal SYS_TS_, a second signal SYS_AACK_, a third signal SYS_ARTRY_, and a fourth signal SYS_TA_.

The present invention recognizes that the start of the data tenure on the lower level bus can be used to terminate the address tenure on the higher level bus because, as a result of the PowerPC™ 60X bus specification, the system bridge (L2 controller) guarantees that, if the data transfer were to be cancelled by the SYS_ARTRY_ signal, then one of two results would occur: SYS_ARTRY_ must be asserted at the same cycle as SYS_TA_, if the fast L2 mode is on; or SYS_ARTRY_ would be asserted no more than one clock cycle later than SYS_TA_, if fast L2 mode is off ("fast" L2 mode allows a PowerPC™ processor to access data faster, without wait states between consecutive data transfers, i.e., requested data packets are transmitted during consecutive clock cycles).

In other words, since SYS_TA_ would be asserted very close in time to SYS_ARTRY_, it would also be asserted no later than concurrently with SYS_AACK_ if a retry were to occur. Therefore, conversely, whenever SYS_TA_ is asserted prior to the assertion of SYS_AACK_, secondary cache 112 can treat SYS_TA_ as a "virtual" SYS_AACK_ and then go ahead to close the CPU address tenure (using CPU_AACK_). In addition, the data can be forwarded to processor bus 110 based upon a fixed cycle relationship (which again depends upon whether the fast L2 mode is activated on the system bus and/or the fast L2 mode is activated on the CPU bus). This approach saves the CPU address bus bandwidth, and reduces the latency of the first returning data from the system bus to the CPU bus.

FIG. 4 illustrates a bus event using a virtual SYS_AACK_ in accordance with the present invention, with a burst data transfer. FIG. 4 assumes that the system bus is running without fast L2 mode while the CPU bus is running with fast L2 mode. For the first data beat, CPU_TA_ is asserted one clock cycle after SYS_TA_.

If SYS_TA_ asserts at the same time as SYS_AACK_, and the system bus is running without fast L2 mode, the L2 controller delays assertion of CPU_TA_ until the assertion of CPU_AACK_ or CPU_ARTRY_ (depending upon whether it is running with or without fast L2 mode on the CPU bus). Otherwise, the CPU bus event cannot cancel the data transfer when the one on the system bus was cancelled.

In this simple case, the CPU address bus is finished earlier by 10 clock cycles, as compared to the prior art, while the latency for the first data transfer is reduced by 10 clock cycles as well. Data transfer latency is reduced because SYS_AACK_ is asserted 10 clock cycles after the first assertion of SYS_TA_. Memory access latency can be further reduced in multi-level cache hierarchies wherein there are many levels of interconnected caches, by implementing the invention at each bus bridge.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. For example, the invention could be applied to other devices that use cache memory, such as a graphic device driver (for a video display monitor). It is therefore contemplated that such modifications can be made without departing from the spirit or scope of the present invention as defined in the appended claims.

What is claimed is:

1. A method of providing a value to a cache used in a computer system, comprising the steps of:

loading the value into a memory array of the computer system;

forwarding an address of the value, from a higher level of the cache to a lower level of the cache, using a higher level bus;

determining that a cache miss of the value has occurred at the lower level of the cache;

forwarding the address, from the lower level of the cache to the memory array, using a lower level bus;

transmitting the value, from the memory array to the lower level of the cache, using the lower level bus;

acknowledging said forwarding of the address from the lower level of the cache, after said step of transmitting the value from the memory array; and acknowledging said forwarding of the address from the higher level of the cache, in response to said transmitting step.

2. The method of claim 1 wherein said step, of acknowledging said forwarding of the address from the higher level of the cache, occurs prior to said step of acknowledging said forwarding of the address from the lower level of the cache.

3. The method of claim 1 further comprising the step of operating the higher level bus at a clock speed which is greater than a clock speed of the lower level bus.

4. The method of claim 1 wherein the value is transmitted in a burst data transfer.

5. The method of claim 1 wherein:

the memory array is a system memory device;

the lower level bus is a system bus; and said step of acknowledging said forwarding of the address from the lower level of the cache includes the step of asserting an acknowledgement signal carried by the system bus.

6. The method of claim 1 wherein:

the higher level of the cache comprises an on-board cache level directly connected to a processor core; and said step of forwarding the address from the higher level of the cache occurs in response to the further steps of issuing a request from the processor core that the value be supplied by the on-board cache level, and determining that a cache miss of the value has occurred at the on-board cache level.

7. The method of claim 1 further comprising the step of transmitting the value from the lower level of the cache to the higher level of the cache using the higher level bus, in response to said step of acknowledging said forwarding of the address from the higher level of the cache.

8. The method of claim 7 wherein said step of transmitting the value from the lower level of the cache to the high level of the cache occurs prior to said step of acknowledging said forwarding of the address from the lower level of the cache.

9. A computer system comprising:

a system memory device;

a system bus;

means for processing program instructions;

a cache connected to said system bus and said processing means, having at least first and second levels; and means for reducing memory access latency between said first and second levels of said cache when a cache miss of a value has occurred at said first and second cache levels, said means for reducing memory access latency including means for (i) forwarding an address of the value, from said first level of said cache to said second level of said cache, using a cache bus, (ii) transmitting the value, from said system memory device to said second level of said cache, using said system bus, and (iii) acknowledging said forwarding of the address from said first level of said cache, in response to said transmitting of the value.

10. The computer system of claim 9 wherein the cache has only two levels, with said first level being connected to said processing means, and said second level being connected to said system bus.

11. The computer system of claim 9 wherein said means for reducing memory access latency includes a bridge control circuit serially connecting said system bus to a cache bus.

12. The computer system of claim 9 wherein:

said means for reducing memory access latency further includes means for (iv) forwarding the address, from said second level of said cache to said system bus, and (v) acknowledging said forwarding of the address from said second level of said cache; and said acknowledging of said forwarding of the address from said first level of the cache, occurs prior to said acknowledging of said forwarding of the address from said second level of said cache.

13. The computer system of claim 9 wherein said cache bus operates at a clock speed which is greater than a clock speed of said system bus.

14. The computer system of claim 9 wherein the value is transmitted in a burst data transfer.

15. The computer system of claim 9 wherein said means for reducing memory access latency further includes means for transmitting the value from said second level of said cache to said first level of said cache using said cache bus, in response to said acknowledging of said forwarding of the address from said first level of said cache.

16. The computer system of claim 15 wherein the value is transmitted from said second level of said cache to said first level of said cache prior to said acknowledging of said forwarding of the address from said second level of said cache.

* * * * *

UNITED STATES PATENT AND TRADEMARK OFFICE

CERTIFICATE OF CORRECTION

PATENT NO. : 6,266,741 B1
DATED : July 24, 2001
INVENTOR(S) : Hui et al.

It is certified that error appears in the above-identified patent and that said Letters Patent is hereby corrected as shown below:

Title page,
Item [73]: add second Assignee: -- Motorola, Inc.; Schaumburg, IL (US) --.

Signed and Sealed this

Second Day of April, 2002

Attest:

JAMES E. ROGAN

*Attesting Officer*

*Director of the United States Patent and Trademark Office*